United States Patent [19]

Peyman et al.

[11] 4,138,191
[45] Feb. 6, 1979

[54] OPERATING MICROSCOPE WITH TWO PAIRS OF STEREO EYE-PIECE LENSES

[76] Inventors: Gholam A. Peyman, 1044 N. Oak Park Ave.; Jeffrey E. Koziol, 1213 N. Lombard St., both of Oak Park, Ill. 60302; Walter I. Fried, 2938 W. Arthur Ave., Chicago, Ill. 60645; Donald R. Sanders, 8110 N. Harding, Skokie, Ill. 60076

[21] Appl. No.: 784,039
[22] Filed: Apr. 4, 1977
[51] Int. Cl.² .................. G02B 21/22; G02B 21/36
[52] U.S. Cl. .......................................... 350/19; 350/36
[58] Field of Search .................... 350/18, 19, 8, 33–36, 350/91, 28 S, 71; 354/79

[56] References Cited

U.S. PATENT DOCUMENTS

| | | | |
|---|---|---|---|
| 3,124,682 | 3/1964 | Kojima et al. | 350/19 |
| 3,173,984 | 3/1965 | Vogl | 350/34 |
| 3,623,807 | 11/1971 | Gabler et al. | 354/79 |
| 3,718,400 | 2/1973 | Yonekubo | 350/19 |
| 3,776,614 | 12/1973 | Kloots et al. | 350/91 |
| 3,909,106 | 9/1975 | Bohler | 350/36 |
| 4,035,057 | 7/1977 | Klein | 350/19 |

FOREIGN PATENT DOCUMENTS 1217099  5/1966  Fed. Rep. of Germany ............. 350/33

Primary Examiner—Jon W. Henry
Attorney, Agent, or Firm—Dulin, Thienpont, Potthast & Snyder

[57] ABSTRACT

A combined operating microscope and illumination system having a coaxial and/or par focal light source for illumination for precise instrumentation during intraocular and other operating procedures. Stereoscopic view for a surgeon and an assistant is provided with an alternatively selective light diverting system in the assistant's light system for photographic purposes. Coaxial and par focal slit illumination are achieved by a light source movable on an arc shaped tract without reflecting light through the surgeon's lens system thereby permitting additional space for a second light system to the assistant without reducing that available to the surgeon.

2 Claims, 6 Drawing Figures

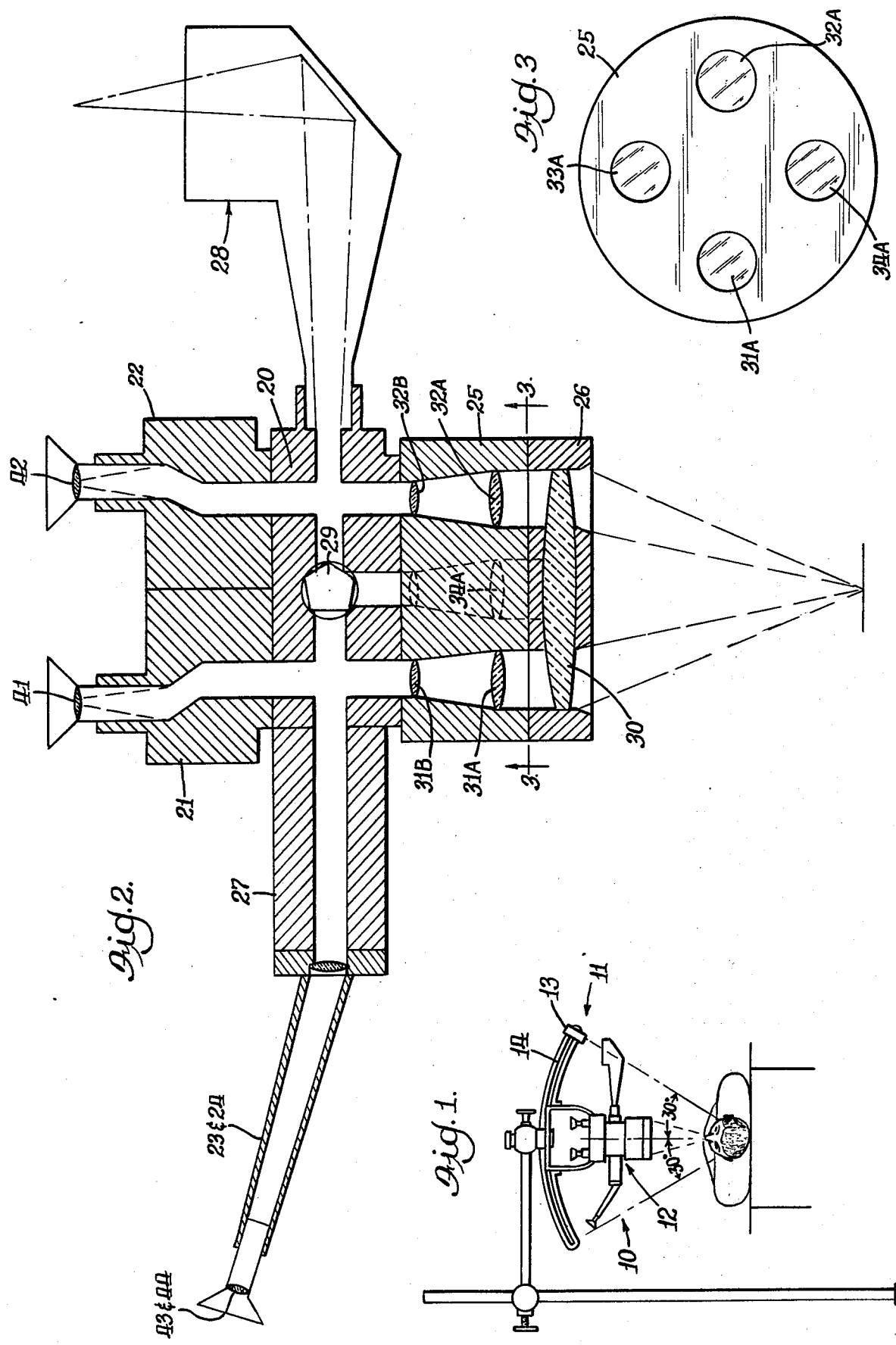

OPERATING MICROSCOPE WITH TWO PAIRS OF STEREO EYE-PIECE LENSES

BACKGROUND OF THE INVENTION

1. Field of the Invention

This invention relates generally to the field of Optics and more specifically to dual stereo-microscopes for use in performing micro-surgery.

2. Description of the Prior Art

The performance of surgery under a microscope has become increasingly popular in recent years, particularly in areas of the body such as the eye and inner ear where precision is imperative. The instrumentation for performing such work has barely kept pace with the increasing needs in the field. Of particular importance is proper illumination at the right level of intensity and at the right location when required by the surgeon.

All presently available operating microscopes were initially constructed to provide a good view of the operative field for one surgeon. As the necessity for the assistant to view the operative field was recognized, either light was taken from the surgeon's view by means of a beam splitter as in the Zeiss operating microscope, or a separate optical system was attached to the body of the microscope as in the Weck microscope. The assistant viewing system of the Zeiss microscope has the obvious disadvantage of decreased illumination for the surgeon and assistant and loss of stereopsis for the assistant. A new attempt by Zeiss to give the assistant a stereoscopic view still has the disadvantage of using beam splitters which decrease the light intensity and the Zeiss arrangement provides much less stereopsis for the assistant than for the surgeon. An older modification by Zeiss using a pentagonal prism and two light sources allows equal stereopsis and light intensity for the surgeon and assistant but requires that the two viewers sit 180° apart, a situation unfeasible for eye surgery.

The disadvantage of the Weck assistant microscope is that the assistant sees the procedure from an entirely different angle and in the case of vitrectomy and other intraocular procedures the assistant has no view of intraocular structures.

In most operating microscopes currently available, the illumination system for the area of surgery is internal of the microscope. Examples of such systems are shown in the U.S. patent to Littmann, No. 3,186,300 and the U.S. patent to Riedel No. 3,170,983. Each of these patents shows a dual, stereomicroscope arrangement with dual internal light sources and prisms for diverting and directing the light beams from the light sources to the area of surgery and back to the eyes of the observer. Such arrangements produce internal relfections from the light source which interfere with the observed light available to the surgeon. Such systems also generally use a prism as a beam-splitter for assistant viewing and photographic capabilities, thereby reducing the available incident light to the surgeon. The illumination rays also occupy a large portion of the available space within the instrument, thereby reducing the space available for transmission of viewing light to the observers.

SUMMARY OF THE INVENTION

The invention provides an improved dual stereo-viewing operating microscope in which the stereo-viewing pairs of tubes are disposed at right angles to each other and in which the available viewing light is not divided by prisms or beam splitters, thereby assuring maximum available light to a surgeon and to an assistant. All field of view illumination is external to the microscope so there is no interference with the srugeon's view due to internal reflection of illuminating light. The cross-sectional area normally occupied by an internal illuminating beam is eliminated, thereby permitting larger available cross-section within the microscope for viewing light transmission.

BRIEF DESCRIPTION OF THE DRAWINGS

FIG. 1 is a schematic perspective view of the combined illumination source and dual stereo-microscope of the present invention;

FIG. 2 is an internal section view of the dual stereo-microscope;

FIG. 3 is a view taken on line 3—3 of FIG. 2; and

DETAILED DESCRIPTION OF THE PREFERRED EMBODIMENT

Figure 4:
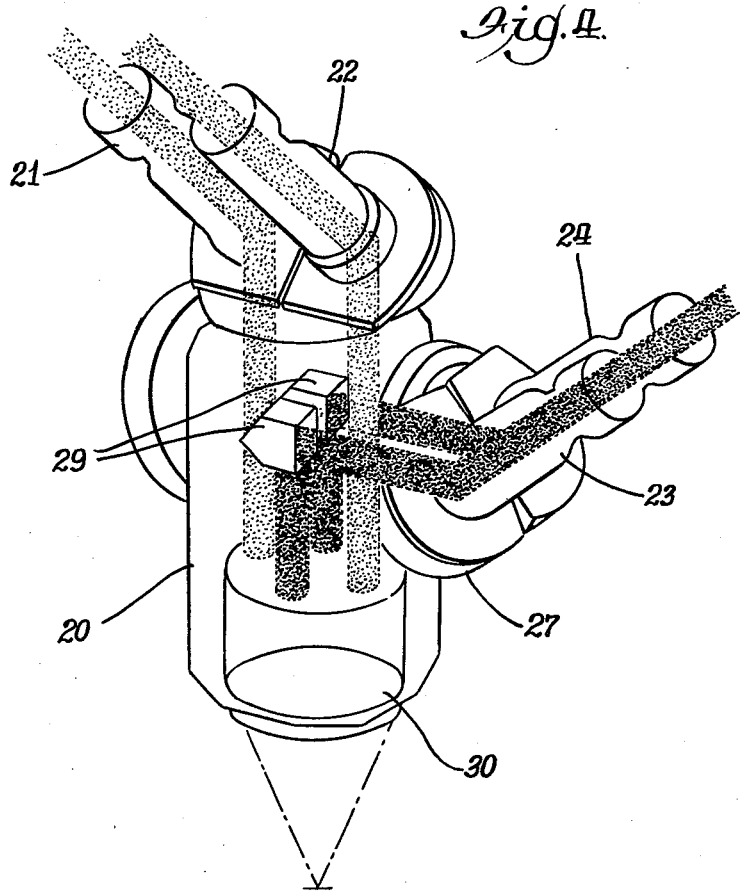
FIG. 4 is a perspective phantom view of the microscope of FIG. 2.
Figure 5A:
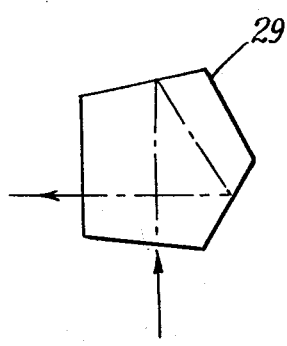
FIGS. 5A and 5B are views of the two position non-inverting prism of FIGS. 2 and 4 showing the path of light rays through the prism.
Figure 5B:
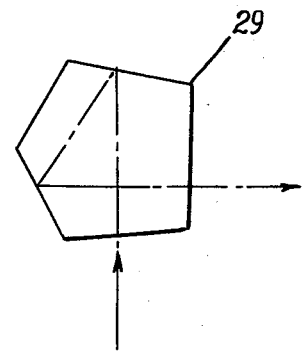

The combined illumination source and dual stereo-microscope system of the present invention is illustrated in FIG. 1 and is designated generally by the numeral 10. The system 10 comprises the illumination source 11 and microscope 12.

The illumination source 11 comprises a slit lamp source 13 movably mounted on an arcuate track 14. This light source was first described and published in Opthalmic Surgery, January 1972. The illumination source 11 is designed to be positioned over a prone patient as shown. Coaxial or paraxial illumination with this light source 13 is achieved without transmitting light through the observer's lens system in the microscope 12. The lamp 13 can be moved manually along the track 14, or it can be motorized (by means not shown) to be moved to a desired position for proper illumination of the area of surgery. The limits of motion for the lamp 13 are from 30° on one side of the patient through the coaxial position to 30° on the opposite side.

The dual stereo-microscope 12 is illustrated schematically in sectional form in FIG. 2. The microscope 12 comprises a hollow central body portion 20, a first pair of stereo-viewing tubes 21 and 22 attached to the body 20, a second pair of stereo-viewing tubes 23 and 24, a lens cartridge 25, and an objective lens housing 26. The stereo-tubes 23 and 24 are attached to the body 20 by means of an extension column 27 of convenient length. A camera 28 is also attached to the body 20 opposite from the viewing tubes 23 and 24, and a two-position non-inverting prism 29 is mounted in the body 20 for alternately diverting the light rays to the viewing tubes 23 and 24 or to the camera 28.

The lens cartridge 25 may comprise a plurality of variable magnification lens combinations or may be a "zoom" type lens structure to provide infinitely variable magnification. The lens housing 26 contains a single large objective lens 30 which collimates the light from the area of surgery before passage through the lens cartridge 25.

The structure of the present invention differs significantly from that of existing stereo-microscopes in that the two pairs of stereo-tubes are disposed at right angles rather than directly opposed as shown in the patents to Riedel and Littmann.

The lens cartridge 25 contains two pairs of lens conbinations for the dual stereo-viewing tubes. The lenses 31A & 31B and 32A & 32B serve as magnifiers for the stereo-tubes 21 and 22, respectively; and the lenses 33A & 33B and 34A & 34B serve as magnifiers for the stereo-tubes 23 and 24, respectively, and for the camera 28.

The stereo-tubes 21 and 22 are intended to be used as the primary stereo-pair for viewing by the surgeon. All of the light incident on the lenses 31A and 32A passes through the respective tubes without diminution to the eyepiece lenses 41 and 42, respectively. Similarly, all of the light incident upon the lenses 33A and 34A is reflected by the non-inverting prism 29 and passed through the tube 27 to the eyepiece lenses 43 and 44, respectively, of the stereo-tubes 23 and 24. At certain intervals in an operative procedure, it may be desired to record the progress on film. This is accomplished by turning the prism 29 by 90° about an axis perpendicular to the plane of FIG. 2, as shown. In the selected position, all of the light incident upon the prism 29 is diverted to the camera 28. The turning of the prism 29 to alternate positions may be accomplished by means of an automated mechanism (not shown) so that the vision of the assistant is interrupted only for the time required to expose the film in the camera 28 and the prism 29 return to its original position after exposure.

In summary, stereopsis of the main observer's or surgeon's view is achieved by focusing two tracts of light through the objective lens 30 and transmitting the two tracts to the observer's eyes undiminished. Two additional tracts of light are developed to give the assistant and camera a stereoscopic, fully illuminated view which is shared between the assistant and camera as desired.

It is to be understood that the embodiment of the invention shown and described is the preferred and that many modifications may be made thereto without departing from the spirit of the invention. The invention is not to be considered as limited to this embodiment except in-so-far as the claims may be so limited.

We claim:

1. A dual stereo-microscope for performing microsurgery comprising:
   an objective lens positioned to view an operating area and on a first line effective to develop a collimated beam of light from said operating area;
   a first pair of stereo-lenses disposed in and normal to said collimated beam and adapted to intercept and develop a first pair of tracts of light;
   a first pair of stereo-eyepiece lenses mounted for observation by a surgeon of the light intercepted by said first pair of stereo-lenses;
   meaans defining a first light transmission path for transmitting the total light intercepted by said first stereo-lenses to said first stereo-eyepiece lenses;
   a second pair of stereo-lenses disposed in and on a second line normal to said collimated beam and perpendicular to said first line and adapted to intercept and develop a second pair of tracts of light;
   a second pair of stereo-eyepiece lenses mounted for observation by a second observer of the light intercepted by said second pair of stereo-lenses; and
   means defining a second light transmission path for transmitting the total light intercepted by said second stereo-lenses of said second stereo-eyepiece lenses.

2. The microscope of claim 1 including:
   an auxiliary camera attached to the microscope; and
   light diverting means mounted in said second light transmission path and operable selectively for diverting the total light intercepted by said second pair of stereo-lenses to said camera for recording on film.

* * * * *

UNITED STATES PATENT OFFICE
CERTIFICATE OF CORRECTION

Patent No. 4,138,191          Dated February 6, 1979

Inventor(s)    Gholam A. Peyman et al.

It is certified that error appears in the above-identified patent and that said Letters Patent are hereby corrected as shown below:

Column 4, line 8, delete "on a first line"

Column 4, line 10, after "and" insert -- on a first line --.

Column 4, line 16, meaans" should read -- means --.

Signed and Sealed this

First Day of May 1979

[SEAL]

*Attest:*

RUTH C. MASON  
*Attesting Officer*

DONALD W. BANNER  
*Commissioner of Patents and Trademarks*